G. D. LOOMIS.
Plow.
No. 213,051. Patented Mar. 11, 1879.
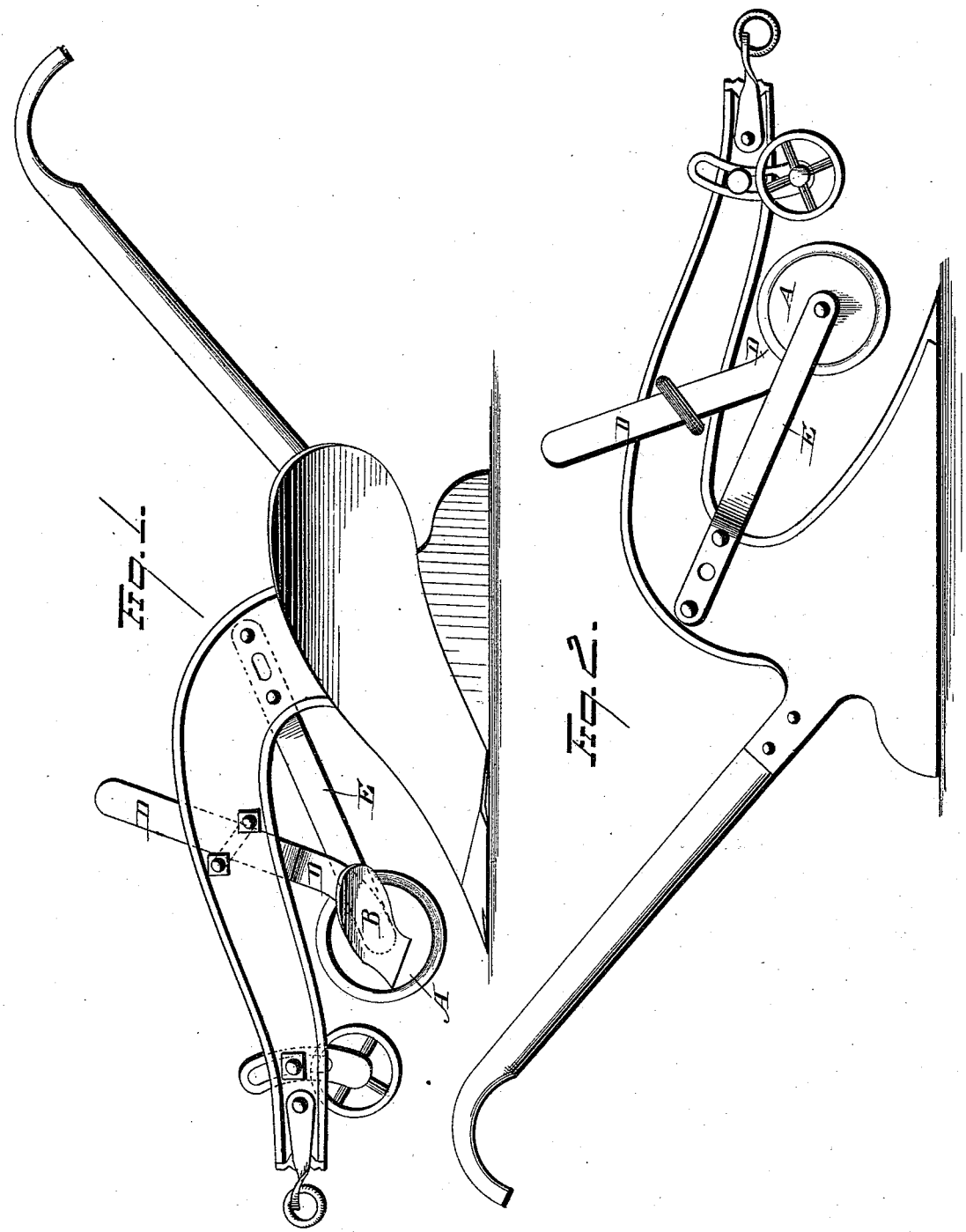
WITNESSES
E. J. Nottingham
A. W. Bright
INVENTOR
Geo. D. Loomis.
By Leggett & Leggett
ATTORNEYS

UNITED STATES PATENT OFFICE.

GEORGE D. LOOMIS, OF TIFFIN, OHIO.

IMPROVEMENT IN PLOWS.

Specification forming part of Letters Patent No. 213,051, dated March 11, 1879; application filed December 21, 1878.

*To all whom it may concern:*

Be it known that I, GEORGE D. LOOMIS, of Tiffin, in the county of Seneca and State of Ohio, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to plows; and it consists in an improved construction wherein a rolling cutter and a jointer are combined in the manner and to the effect as will hereinafter appear.

In the drawings, Figure 1 is a view of one side of my device, and Fig. 2 a side elevation of the other side thereof.

By the arrangement of the rolling cutter and jointer shown in the drawings, anything on the surface of the ground can be cut and turned under before the furrow proper is turned over. This insures clean work and saves a large amount of labor in afterward harrowing the land. It is, of course, necessary that the rolling cutter should operate ahead of the jointer, in order that the obstructions may be separated or cut off before the jointer turns them over.

A is the rolling cutter, made of metal, and provided with a sufficiently sharp edge. B is the jointer, made of one or more pieces of metal, and of any desired shape whatever, although I have found the shape shown in the drawings, which is substantially that of a miniature mold-board, to serve the most useful purpose.

D E are arms or standards, connecting, respectively, the jointer B and rolling cutter A to the plow, and these standards or connections D E can either be used together or separately, as I do not limit myself in any manner to any particular method of attaching the cutter and jointer to the plow, although I prefer that these attachments should be adjustable, so as to permit of a ready adaptation of the plow to any work.

The rolling cutter turns on a pivot passing through its center, which is fastened to the arm E; or the arm E may be discarded and the pin or pivot fastened to the arm or standard, or even to the jointer B, if desired. The jointer B is fastened to an arm or standard that may be run from the plow in any desired direction. The face of the rolling cutter next adjacent to the jointer may be flat or countersunk, as shown in the drawings. If made flat, there is more danger of clogging the rolling cutter by dirt or grass passing between it and the jointer-point. By countersinking or turning out a recess in the rolling cutter, as before specified, and beveling the edge of said rolling cutter, this difficulty is obviated, as the point or cutting-edge of the jointer is thereby hid behind the annular flange of the cutter thus formed, and the dirt and débris will pass by the edge of the jointer without getting between it and the rolling cutter.

What I claim is—

1. The combination, with a revolving cutter, adjustably secured to the plow-beam, of a jointer the point of which is located in the rear of the forward edge of the cutter, said jointer adjustably secured to the plow-beam, substantially as set forth.

2. A revolving cutter having a depressed or countersunk surface, in combination with a jointer, whereby grass and débris are prevented from entering between said cutter and jointer, substantially as and for the purposes described.

In testimony whereof I have signed my name to this specification in the presence of two subscribing witnesses.

GEORGE D. LOOMIS.

Witnesses:
R. ABBOTT,
IRA E. STRONG.